(12) United States Patent
Yun

(10) Patent No.: US 10,556,616 B2
(45) Date of Patent: Feb. 11, 2020

(54) DAMPING COUPLER OF ELECTRONIC POWER STEERING APPARATUS

(71) Applicant: MANDO CORPORATION, Gyeonggi-do (KR)

(72) Inventor: Tae Jung Yun, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 233 days.

(21) Appl. No.: 15/690,274

(22) Filed: Aug. 29, 2017

(65) Prior Publication Data

US 2018/0065656 A1    Mar. 8, 2018

(30) Foreign Application Priority Data

Sep. 6, 2016    (KR) .................. 10-2016-0114417

(51) Int. Cl.
| | | |
|---|---|---|
| *B62D 5/04* | (2006.01) | |
| *F16D 3/68* | (2006.01) | |
| *F16D 3/54* | (2006.01) | |
| *B62D 7/22* | (2006.01) | |

(52) U.S. Cl.
CPC .......... *B62D 5/0403* (2013.01); *B62D 5/0409* (2013.01); *F16D 3/54* (2013.01); *F16D 3/68* (2013.01); *B60Y 2306/09* (2013.01); *B62D 5/0454* (2013.01); *B62D 7/226* (2013.01)

(58) Field of Classification Search
CPC ........ B62D 5/0403; B62D 5/0409; F16D 3/68
See application file for complete search history.

(56) References Cited

U.S. PATENT DOCUMENTS

| | | | | |
|---|---|---|---|---|
| 7,625,290 B2* | 12/2009 | Hodjat | ...................... | F16D 3/68 |
| | | | | 464/75 |
| 9,789,903 B2* | 10/2017 | Moriyama | ........... | B62D 5/0409 |
| 9,897,148 B2* | 2/2018 | Hong | .................. | B62D 5/0409 |
| 10,054,190 B2* | 8/2018 | Kim | ........................ | F16D 3/12 |

FOREIGN PATENT DOCUMENTS

| | | |
|---|---|---|
| JP | 2016-20718 | 2/2016 |
| KR | 10-2010-0109641 | 10/2010 |

OTHER PUBLICATIONS

Office Action dated Sep. 13, 2018 for Korean Patent Application 10-2017-0110449 and its English translation by Global Dossier.

* cited by examiner

*Primary Examiner* — Kevin Hurley
(74) *Attorney, Agent, or Firm* — Ladas & Parry, LLP

(57) ABSTRACT

Disclosed herein is a damping coupler of an electronic steering apparatus. The damping coupler includes a first spline having a first shaft hole such that a worm shaft is inserted therein, with a first serration being formed in the first shaft hole to engage with a serration of the worm shaft; a second spline coupled to a side of the first spline, and having a second shaft hole such that the worm shaft is inserted therein, with a second serration being formed in the second shaft hole to engage with a serration of the worm shaft; and a molding surrounding outsides of the first and second splines, and coupled to a motor shaft.

20 Claims, 5 Drawing Sheets

[FIG. 1]
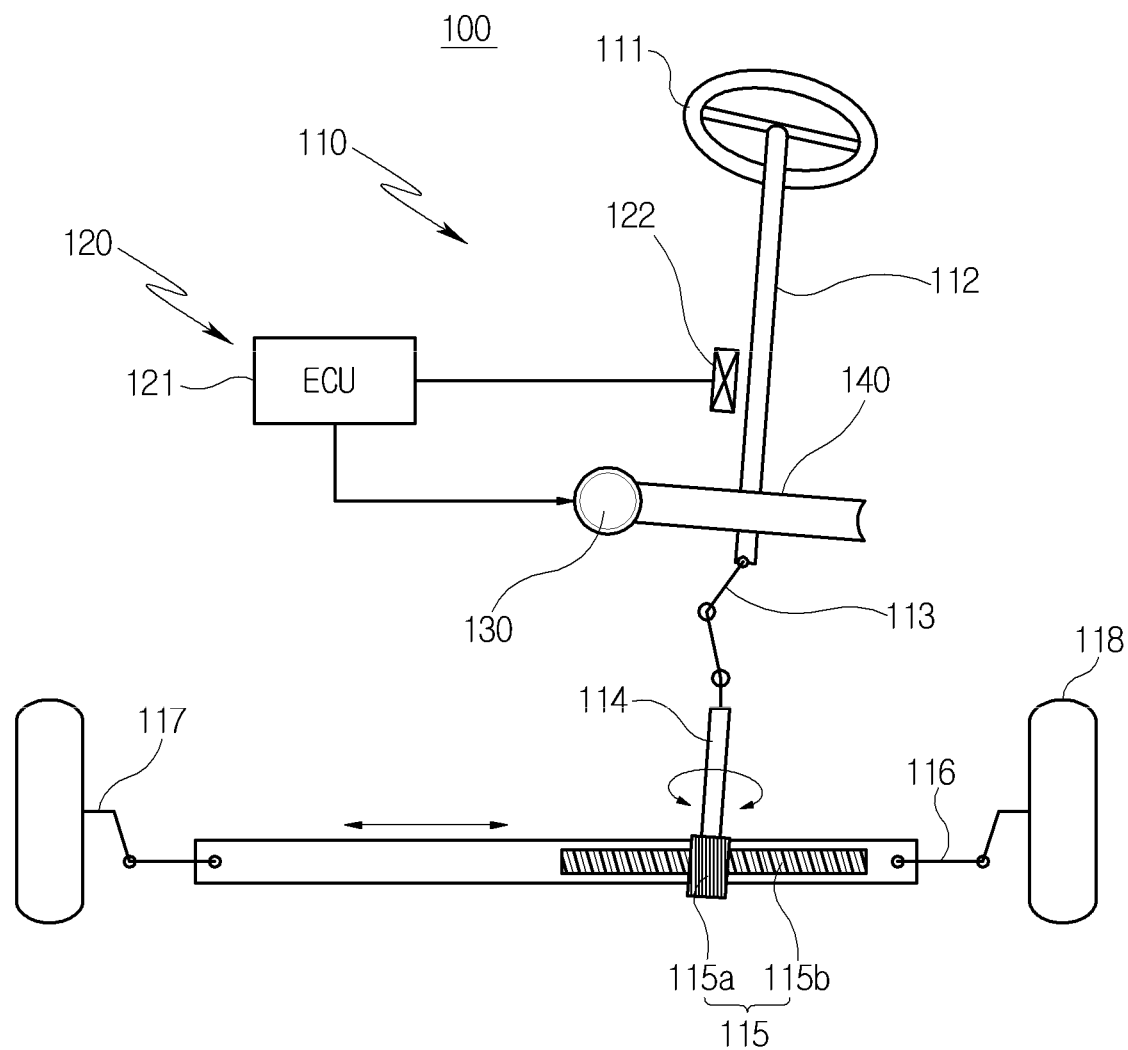

[FIG. 2]
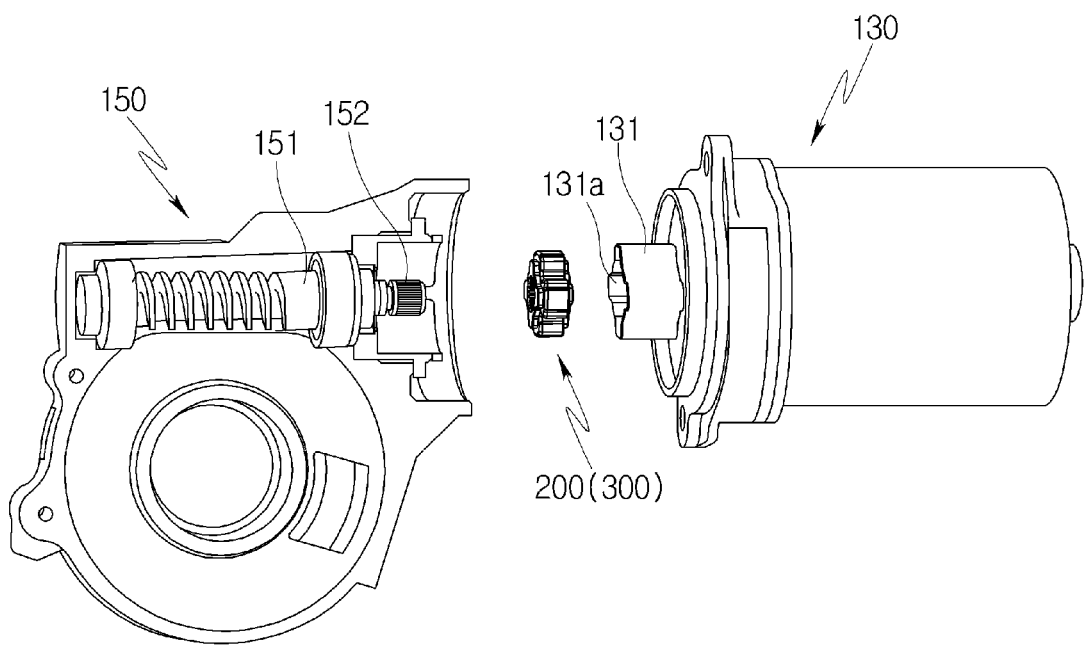

[FIG. 3]
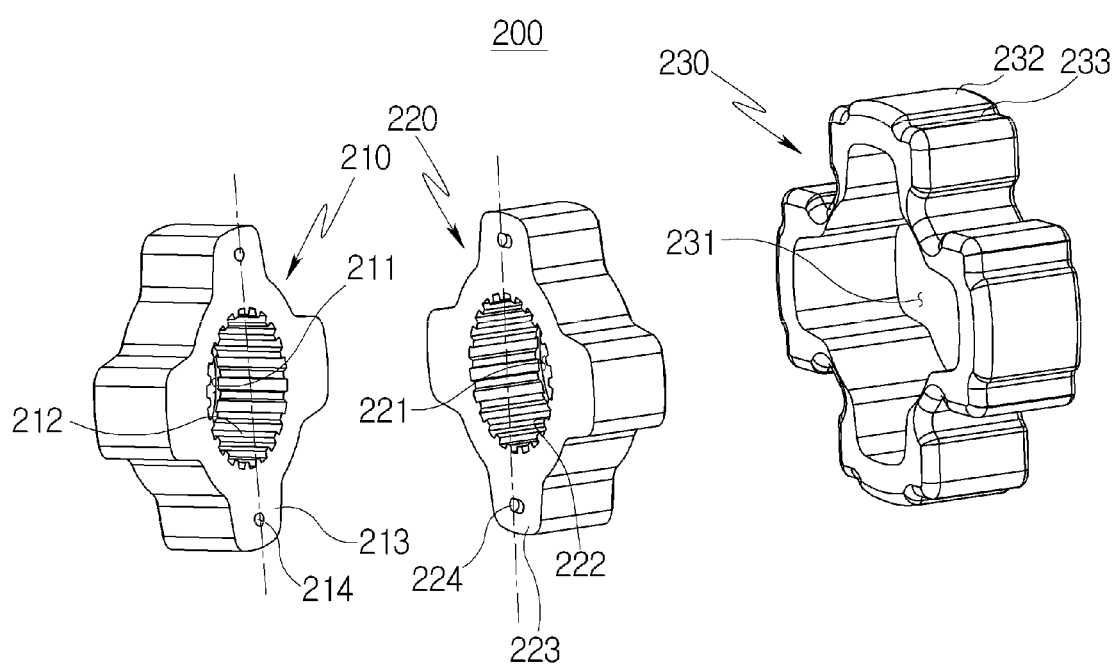

[FIG. 4]
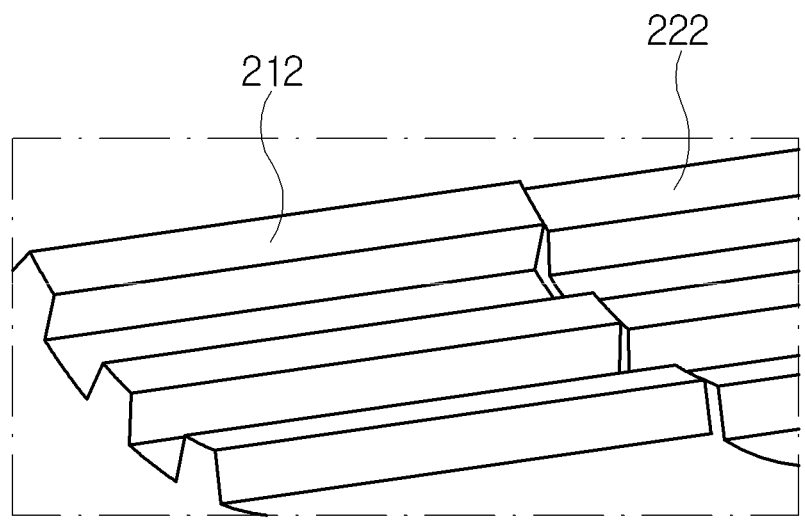
[FIG. 5]
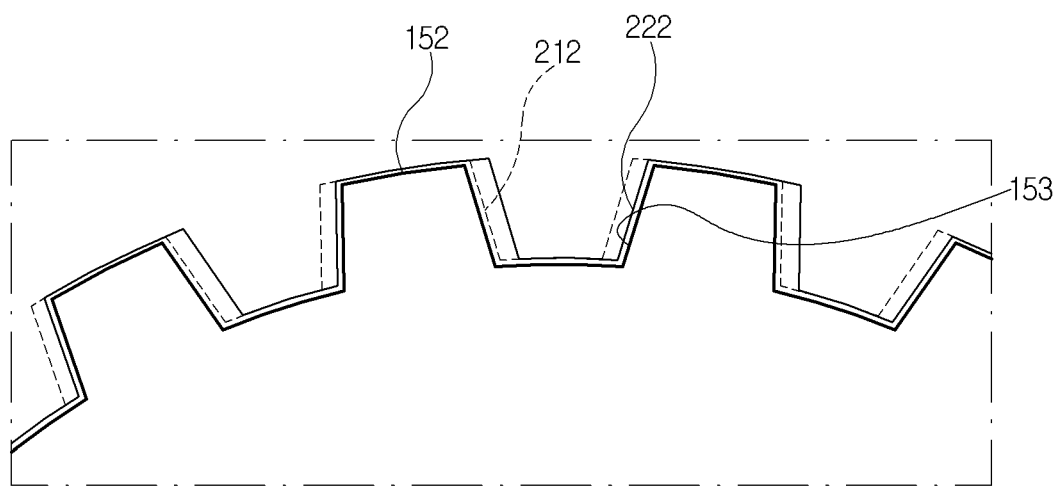

[FIG. 6]
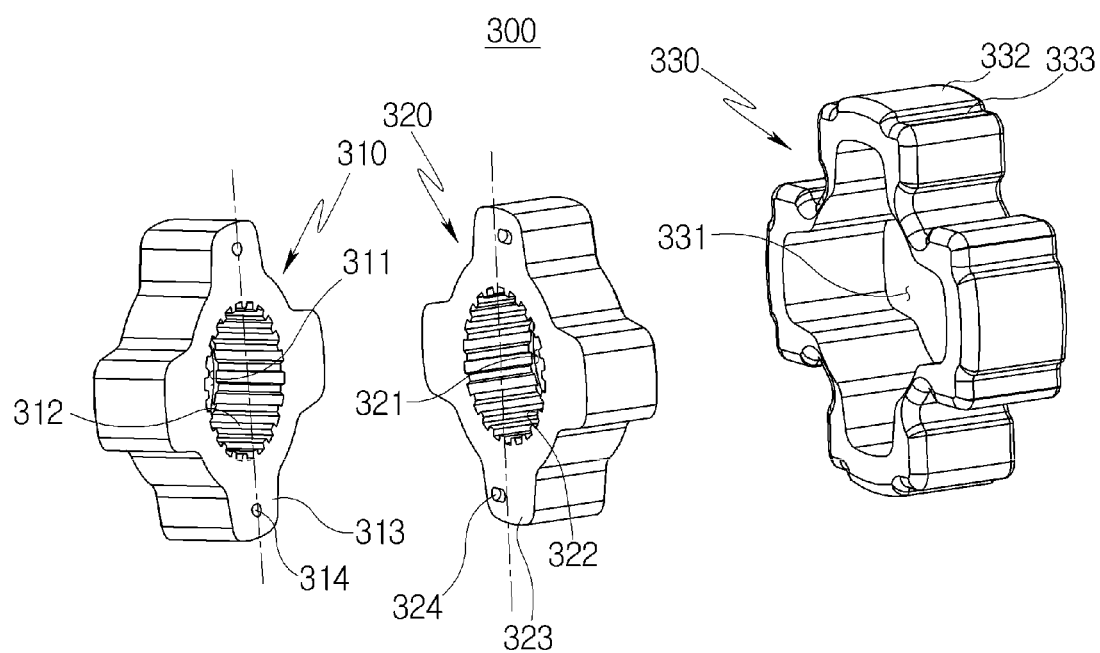
[FIG. 7]
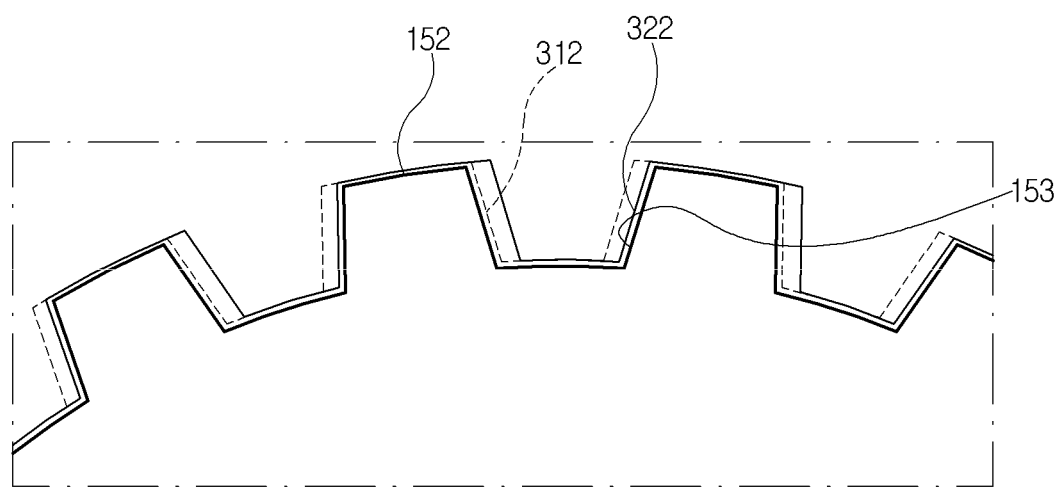

DAMPING COUPLER OF ELECTRONIC POWER STEERING APPARATUS

CROSS-REFERENCE TO RELATED APPLICATION

This application claims priority to Korean Patent Application No. 10-2016-0114417, filed on Sep. 6, 2016, the disclosure of which is incorporated herein by reference in its entirety.

BACKGROUND OF THE INVENTION

Field of the Invention

Exemplary embodiments of the present disclosure relate to an electronic steering apparatus, and more particularly, to a damping coupler of an electronic steering apparatus.

Description of the Related Art

A steering apparatus of a vehicle is an apparatus that freely change a moving direction of the vehicle by turning a steering wheel and aids in moving the vehicle in a desired direction by optionally changing a rotation center around which a wheel of the vehicle rotates. As an auxiliary power mechanism that is configured so that it is easier for a driver to steer a vehicle, a power steering apparatus is utilized. Such a power steering apparatus mainly includes a hydraulic steering apparatus that uses hydraulic pressure for supplementing a steering force by operating a hydraulic pump using the force of an engine, and an electronic steering apparatus that uses an electric motor.

The hydraulic steering apparatus is configured to detect the rotation of the steering wheel, receive a rotating force from the engine, operate the hydraulic pump, and send the hydraulic pressure to a drive unit such as a rack bar or a cylinder provided in the steering shaft, thus supplementing the steering force of a driver.

The electronic steering apparatus is configured to detect the rotation of the steering wheel and actuate the motor that is installed in the rack or the steering shaft to assist a rotary motion, thus allowing the steering apparatus to be smoothly operated. The electronic power auxiliary steering apparatus mainly includes a rack assist type (R-EPS) and a steering shaft assist type (C-EPS).

Such an electronic steering apparatus includes a motor having a motor shaft that protrudes at an end thereof, a gear housing accommodating a worm shaft therein, and a damping coupler coupling the worm shaft with the motor shaft.

Here, serrations are formed on an end of the worm shaft, a shaft hole is formed in the damping coupler such that the worm shaft is inserted therein, and serrations are formed around the shaft hole to engage with the serrations of the worm shaft.

In order to provide assembling convenience when the damping coupler is generally assembled with the motor shaft and the worm shaft, it is designed to form gaps between the serrations of the worm shaft and the serrations of the damping coupler. However, in this case, when a driving force generated from the motor shaft is transmitted from the worm shaft to the damping coupler, great rattle noise may be made by the gaps.

RELATED ART DOCUMENT

Patent Document

Korean Patent Laid-Open Publication No. 10-2010-0109641

SUMMARY OF THE INVENTION

An object of the present disclosure is to provide a damping coupler of an electronic steering apparatus intended to reduce rattle noise that may be generated by torque load when both a worm shaft and the damping coupler rotate.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a damping coupler of an electronic steering apparatus may include a first spline having a first shaft hole such that a worm shaft is inserted therein, with a first serration being formed in the first shaft hole to engage with a serration of the worm shaft; a second spline coupled to a side of the first spline, and having a second shaft hole such that the worm shaft is inserted therein, with a second serration being formed in the second shaft hole to engage with a serration of the worm shaft; and a molding surrounding outsides of the first and second splines, and coupled to a motor shaft.

A first phase adjustment part may be formed on a surface of the first spline, and a second phase adjustment part may be formed on a surface of the second spline facing the first spline to be coupled to the first phase adjustment part.

The first phase adjustment part may be a recess that may be concavely formed in the first spline, and the second phase adjustment part may be a protuberance that may protrude out from the second spline.

The first phase adjustment part may be a protuberance that may protrude out from the first spline, and the second phase adjustment part may be a recess that may be concavely formed in the second spline.

A first protrusion may be formed on an outside of the first spline, a second protrusion corresponding to the first protrusion may be formed on an outside of the second spline, and a third protrusion may be formed on an outside of the molding to surround the first protrusion and the second protrusion. The first serration and the second serration may have different phases.

The first serration and the second serration may have different phases.

The first phase adjustment part may be formed on a line connecting a center of the first shaft hole with a center of the first protrusion, and the second phase adjustment part may be formed on a line connecting a center of the second shaft hole with a center of the second protrusion.

The first serration and the second serration may have the same phase.

The first phase adjustment part may be formed on a line connecting a center of the first shaft hole with a center of the first protrusion, and the second phase adjustment part may be formed at a position deviating from a line connecting a center of the second shaft hole with a center of the second protrusion.

An uneven part may be formed on an outside of the third protrusion.

The motor shaft may have a shaft hole, and the molding may be inserted into the shaft hole.

The molding may be made of a rubber material.

According to an embodiment of the present disclosure, the damping coupler is divided into a first spline and a second spline. One surface of a first serration of the first spline and the other surface of a second serration of the second spline may be coupled while minimizing a gap in a space between the serrations of the worm shaft. Therefore, at least one of the first serration of the first spline or the second serration of the second spline minimizes the gap in the space of the worm shaft, thus minimizing the rattle noise that may be generated by torque load when the worm shaft and the damping coupler rotate.

The present disclosure is not limited to the foregoing effects, and it should be understood to cover all effects that may be inferred from the configuration described in the detailed description or claims of the present disclosure.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a configuration view illustrating a general electronic steering apparatus;

FIG. 2 is a perspective view illustrating a motor and a reducer of an electronic steering apparatus;

FIG. 3 is an exploded perspective view illustrating a damping coupler of the electronic steering apparatus according to a first embodiment of the present disclosure;

FIG. 4 is a perspective view illustrating a part of the damping coupler of the electronic steering apparatus according to the first embodiment of the present disclosure;

FIG. 5 is a sectional view illustrating a state in which the damping coupler of the electronic steering apparatus according to the first embodiment of the present disclosure is coupled to a worm shaft;

FIG. 6 is an exploded perspective view illustrating a damping coupler of an electronic steering apparatus according to a second embodiment of the present disclosure; and FIG. 7 is a sectional view illustrating a state in which the damping coupler of the electronic steering apparatus according to the second embodiment of the present disclosure is coupled to a worm shaft.

DESCRIPTION OF SPECIFIC EMBODIMENTS

Embodiments of the present disclosure are described in detail below with reference to the accompanying drawings. However, the present disclosure may be implemented in various forms without being limited to the described embodiments. Further, it should be understood that parts which are not related to the present disclosure are omitted in the drawings for clarity of description. Like reference numerals are used to identify like elements throughout different drawings.

When the term "connect" is used in the following description, it is intended to mean not only "directly connected to" but also "indirectly connected to" such as connected through another intervening element. Further, the term "include" means that it may further include another component without excluding another component, unless otherwise specified.

FIG. 1 is a schematic view of an electronic steering apparatus.

Referring to FIG. 1, an electronic steering apparatus 100 includes a steering system 110 extending from a steering wheel 111 to both wheels 118, and an auxiliary power mechanism 120 providing an auxiliary steering power to the steering system 110.

The steering system 110 includes a steering shaft 112 that is connected at one side thereof to the steering wheel 111 to rotate along with the steering wheel 111 and is connected at the other side thereof to a pinion shaft 114 via a pair of universal joints 113.

Further, the pinion shaft 114 is connected to the rack bar through a rack-pinion mechanism 115, and both ends of the rack bar are connected to a wheel 118 of the vehicle through a tie rod 116 and a knuckle arm 117.

The rack-pinion mechanism 115 is formed by engaging a pinion gear 115a formed on the pinion shaft 114 and a rack gear 115b formed on a side of an outer circumference of the rack bar with each other. Hence, if a driver manipulates the steering wheel 111, torque is generated in the steering system 110 and the wheel 118 is steered through the rack-pinion mechanism 115 and the tie rod 116 by torque.

The auxiliary power mechanism 120 includes a torque sensor 122 that outputs an electric signal in proportion to detected torque after a driver detects torque applied to the steering wheel 111, an electronic control unit (ECU) 121 that generates a control signal based on the electric signal transmitted from the torque sensor 122, a motor 130 that generates auxiliary power based on a signal transmitted from the electronic control unit 121, and a motor deceleration mechanism 140 that transmits auxiliary power generated from the motor to the steering shaft 112.

FIG. 2 is an exploded perspective view illustrating a part of an electronic steering apparatus to which a damping coupler according to an embodiment of the present disclosure is applied.

Referring to FIG. 2, the electronic steering apparatus according to the embodiment of the present disclosure includes a motor 130 having a motor shaft 131 that protrudes at an end thereof, a gear housing 150 accommodating a worm shaft 151 therein, and a damping coupler 200 coupling the worm shaft 151 with the motor shaft 131.

The damping coupler 200 is configured such that a first spline and a second spline are coupled thereto, and molding is formed on the outside of the first and second splines.

A plurality of serrations is axially formed at regular intervals on an end of the worm shaft 151, and the first and second splines are coupled to serrations 152 formed on an end of the worm shaft 151. That is, a shaft hole is formed through each of the first and second splines, and first and second serrations are axially formed around the shaft hole. Therefore, each of the first serration of the first spline and the second serration of the second spline is coupled with the serration 152 formed on an end of the worm shaft 151.

The molding is provided on the outside of the first and second splines and simultaneously is coupled to an inner circumference 131a of the motor shaft 131.

FIG. 3 is an exploded perspective view illustrating the damping coupler of the electronic steering apparatus according to the first embodiment of the present disclosure, and FIG. 4 is a perspective view illustrating a part of the damping coupler of the electronic steering apparatus according to the first embodiment of the present disclosure.

Referring to FIGS. 3 and 4, the damping coupler 200 of the first embodiment includes a first spline 210, a second spline 220, and a molding 230.

A first shaft hole 211 is formed in a center of the first spline 210 such that an end of the worm shaft 151 (see FIG.

2) is inserted therein. A plurality of first serrations 212 is axially formed around the first shaft hole 211. The first serrations 212 are coupled to spaces 153 (see FIG. 5) between the serrations formed on an end of the worm shaft. The first spline 210 has a plurality of first protrusions 213 protruding outwards. The first protrusion 213 has a predetermined height in a radial direction from the outer circumference of the first spline 210. Further, the first protrusion 213 may have a predetermined width in an arc direction from the outer circumference of the first spline 210. The plurality of first protrusions 213 may be formed on the outside of the first spline 210 at regular intervals.

The second spline 220 is coupled to a side of the first spline 210, and has a shape corresponding to that of the first spline 210. A second shaft hole 221 is formed in a center of the second spline 220 such that the end of the worm shaft is inserted therein. A plurality of second serrations 222 is axially formed around the second shaft hole 221. The second serrations 222 are coupled to the spaces 153 between the serrations formed on the end of the worm shaft. Here, the second serration 222 of the second spline 220 is different in phase from the first serration 212 of the first spline 210. The second spline 220 has a plurality of second protrusions 223 protruding outwards. The second protrusion 223 has a predetermined height in a radial direction from the outer circumference of the second spline 220. Further, the second protrusion 223 may have a predetermined width in an arc direction from the outer circumference of the second spline 220. The plurality of second protrusions 223 may be formed on the outside of the second spline 220 at regular intervals.

At least one first phase adjustment part 214 is formed on a surface of the first spline 210. For example, two first phase adjustment parts 214 may be formed on the surface of the first spline 210. Each first phase adjustment part may be formed at the same distance from a center of the first shaft hole 211. Preferably, the first phase adjustment part is formed on a surface of the first protrusion having a predetermined width and height. Further, the first phase adjustment part 214 is formed on a line connecting the center of the first shaft hole 211 with the center of the width of the first protrusion 213. According to the first embodiment, two first phase adjustment parts 214 are formed. However, the number of the first phase adjustment parts 214 may be adjusted as necessary.

Further, according to the first embodiment, the first phase adjustment part 214 has a circular section, but is not limited thereto. That is, the first phase adjustment part 214 may have a polygonal section, as long as it corresponds to a section of the second phase adjustment part.

Two second phase adjustment parts 224 are formed on a surface of the second spline 220 facing the first spline 210 to be correspondingly coupled to the first phase adjustment parts 214. For example, two second phase adjustment parts 224 may be formed on the surface of the second spline 220 facing the first spline 210, and may be formed at the same distance from the center of the second shaft hole 221. Preferably, the second phase adjustment part 224 is formed on a surface of the second protrusion 223 having a predetermined width and height. The second phase adjustment part 224 may be formed on a line connecting the center of the second shaft hole 221 with a center of the width of the second protrusion 223. That is, when the first and second serrations 221 and 222 have different phases, the first and second phase adjustment parts 214 and 224 may be located on the same axial line. The number of the second phase adjustment parts 224 may be adjusted depending on the number of the first phase adjustment parts 214.

Further, according to the first embodiment, the second phase adjustment part 224 has a circular section, but is not limited thereto. That is, the second phase adjustment part 224 may have a polygonal section, as long as it corresponds to the section of the first phase adjustment part 214.

The first phase adjustment part 214 may be a recess that is concavely formed in the first spline 210, while the second phase adjustment part 224 may be a protuberance that protrudes out from the second spline 220. Alternatively, the first phase adjustment part 214 may be a protuberance that protrudes out from the first spline 210, while the second phase adjustment part 224 may be a recess that is concavely formed in the second spline 220.

The molding 230 is provided outside the first and second splines 210 and 220 to surround the first and second splines 210 and 220. Therefore, the molding 230 has an inner circumference 231 corresponding to the shape of the outer circumferences of the first and second splines 210 and 220. Further, the molding 230 may have a plurality of third protrusions 232 to be correspondingly coupled to the inner circumference of the motor shaft.

The molding 230 is inserted into the inner circumference of the motor shaft. Here, an uneven part 233 may be formed on an outer surface of the third protrusion 232 of the molding 230. The uneven part 233 may be formed to be long in the same direction as the first and second serrations 212 and 222. The uneven part 233 enables the molding to be firmly coupled with the motor shaft.

The molding may be formed outside the first and second splines through insert molding or the like in a state where the first and second splines are coupled. The molding 230 may be made of a material having a sufficient elastic force, for instance, a rubber material to attenuate vibration transmitted to the first and second splines 210 and 220 when the motor is driven.

The damping coupler 200 according to the first embodiment configured as such may couple the first spline 210 to the worm shaft and then couple the second spline 220 to the worm shaft to be in close contact with the first spline 210. That is, the first serrations 212 of the first spline 210 and the second serrations 222 of the second spline 220 are coupled to the spaces 153 between the serrations 152 of the worm shaft. Further, the first phase adjustment part of the first spline 210 and the second phase adjustment part 224 of the second spline 220 are coupled with each other.

As illustrated in FIG. 5, since the second serrations 222 of the second spline 220 and the first serrations 212 of the first spline 210 have different phases and the first and second phase adjustment parts 214 and 224 are formed on the same axial line, one surface of the first serration 212 and the other surface of the second serration 224 are coupled to each other while minimizing the gap in each space 153 of the worm shaft. Here, the first phase adjustment part and the second phase adjustment part are coupled with each other such that the first and second serrations are kept in a staggered arrangement. In addition, the molding also maintains the firm coupling of the first and second splines.

As such, at least one of the first serration 212 of the first spline 210 or the second serration 222 of the second spline 220 is arranged to minimize the gap in the space of the worm shaft, thus minimizing a rattle noise that may be generated by torque load when the worm shaft and the damping coupler 200 rotate.

FIG. 6 is an exploded perspective view illustrating a damping coupler according to a second embodiment of the present disclosure.

Referring to FIG. 6, the damping coupler 300 according to the second embodiment includes a first spline 310, a second spline 320, and a molding 330.

A first shaft hole 311 is formed in a center of the first spline 310 such that the end of the worm shaft 151 (see FIG. 2) is inserted therein. A plurality of first serrations 312 is axially formed around the first shaft hole 311 at regular intervals. The first serrations 312 are coupled to spaces 153 (see FIG. 7) between the serrations formed on the end of the worm shaft. The first spline 310 has a plurality of first protrusions 313 protruding outwards. The first protrusion 313 has a predetermined height in a radial direction from the outer circumference of the first spline 310. Further, the first protrusion 313 may have a predetermined width in an arc direction from the outer circumference of the first spline 310. The plurality of first protrusions 313 may be formed on the outside of the first spline 310 at regular intervals.

The second spline 320 is coupled to a side of the first spline 310, and has a shape corresponding to that of the first spline 310. A second shaft hole 321 is formed in a center of the second spline 320 such that the end of the worm shaft is inserted therein. A plurality of second serrations 322 is formed around the second shaft hole 321. The second serrations 322 are coupled to the spaces between the serrations formed on the end of the worm shaft. Here, the second serration 322 of the second spline 320 has the same phase as the first serration 312 of the first spline 310. The second spline 320 has a plurality of second protrusions 323 protruding outwards. The second protrusion 323 has a predetermined height in a radial direction from the outer circumference of the second spline 320. Further, the second protrusion 323 may have a predetermined width in an arc direction from the outer circumference of the second spline 320. The plurality of second protrusions 323 may be formed on the outside of the second spline 320 at regular intervals.

At least one first phase adjustment part 314 is formed on a surface of the first spline 310. For example, two first phase adjustment parts 314 may be formed on the surface of the first spline 310. Each first phase adjustment part may be formed at the same distance from a center of the first shaft hole 311. Preferably, the first phase adjustment part 314 is formed on a surface of the first protrusion 313 having a predetermined width and height. Further, the first phase adjustment part 314 is formed on a line connecting the center of the first shaft hole with the center of the width of the first protrusion 313. According to the second embodiment, two first phase adjustment parts 314 are formed. However, the number of the first phase adjustment parts 314 may be adjusted as necessary.

Further, according to the second embodiment, the first phase adjustment part 314 has a circular section, but is not limited thereto. That is, the first phase adjustment part 314 may have a polygonal section, as long as it corresponds to a section of a second phase adjustment part 324 that will be described later.

Two second phase adjustment parts 324 are formed on a surface of the second spline 320 facing the first spline 310 to be correspondingly coupled to the first phase adjustment parts 314. For example, two second phase adjustment parts 324 may be formed on the surface of the second spline 320 facing the first spline 310, and may be formed at the same distance from the center of the second shaft hole 321. Preferably, the second phase adjustment part 324 is formed on a surface of the second protrusion 323 having a predetermined width and height. The second phase adjustment part 324 may be formed at a position deviating from a line connecting the center of the second shaft hole 321 with a center of the width of the second protrusion 323. That is, when the first and second serrations 312 and 322 have the same phase, the first and second phase adjustment parts 314 and 324 may be located on different axial lines. The number of the second phase adjustment parts 324 may be adjusted depending on the number of the first phase adjustment parts 314.

Further, according to the second embodiment, the second phase adjustment part 324 has a circular section, but is not limited thereto. That is, the second phase adjustment part 324 may have a polygonal section, as long as it corresponds to the section of the first phase adjustment part 314.

The first phase adjustment part 314 may be a recess that is concavely formed in the first spline 310, while the second phase adjustment part 324 may be a protuberance that protrudes out from the second spline 320. Alternatively, the first phase adjustment part 314 may be a protuberance that protrudes out from the first spline 310, while the second phase adjustment part 324 may be a recess that is concavely formed in the second spline 320.

The molding 330 is provided outside the first and second splines 310 and 320 to surround the first and second splines 310 and 320. Therefore, the molding 330 has an inner circumference 331 corresponding to the shape of the outer circumferences of the first and second splines 310 and 320. Further, the molding 330 may have a plurality of third protrusions 332 to be correspondingly coupled to the inner circumference of the motor shaft.

The molding 330 is inserted into the inner circumference of the motor shaft. Here, an uneven part 333 may be formed on an outer surface of the third protrusion 332 of the molding 330. The uneven part 333 may be formed to be long in the same direction as the first and second serrations 312 and 322. The uneven part 333 enables the molding to be firmly coupled with the motor shaft.

The molding 330 may be formed outside the first and second splines through insert molding or the like in a state where the first and second splines 310 and 320 are coupled. The molding 330 may be made of a material having a sufficient elastic force, for instance, a rubber material to attenuate vibration transmitted to the first and second splines 310 and 320 when the motor is driven.

The damping coupler 300 according to the second embodiment configured as such may couple the first spline 310 to the worm shaft and then couple the second spline 320 to the worm shaft to be in close contact with the first spline 310. That is, the first serrations 312 of the first spline 310 and the second serrations 322 of the second spline 320 are coupled to the spaces 153 between the serrations of the worm shaft. Here, the first phase adjustment part 314 of the first spline 310 and the second phase adjustment part 324 of the second spline 320 are coupled with each other.

Since the second serrations 322 of the second spline 320 and the first serrations 312 of the first spline 310 have the same phase and the first and second phase adjustment parts 314 and 324 are formed on different axial lines, either of the first phase adjustment part 314 of the first spline 310 or the second phase adjustment part 324 of the second spline 320 is twisted by a predetermined amount to couple the first and second phase adjustment parts to each other.

For example, if the first phase adjustment part 314 and the second phase adjustment part 324 are coupled with each other in a state where the second spline 320 is twisted by a predetermined angle in a direction relative to the first spline 310, as illustrated in FIG. 7, one surface of the first serration 312 and the other surface of the second serration 322 are coupled to each other while minimizing the gap in each serration of the worm shaft, similarly to the first embodiment. Here, the first phase adjustment part 314 and the second phase adjustment part 324 are coupled with each other such that the first and second serrations 312 and 322 are kept in a staggered arrangement. In addition, the molding also maintains the firm coupling of the first and second splines 310 and 320.

As such, at least one of the first serration 312 of the first spline 310 or the second serration 322 of the second spline 320 is arranged to minimize the gap in the space 153 of the worm shaft, thus minimizing a rattle noise that may be generated by torque load when the worm shaft and the damping coupler 200 rotate.

While the present disclosure has been described with respect to the specific embodiments, it will be apparent to those skilled in the art that various changes and modifications may be made without departing from the spirit and scope of the invention as defined in the following claims.

What is claimed is:

1. A damping coupler of an electronic steering apparatus, comprising:
    a first spline having a first shaft hole such that a worm shaft is inserted therein, with a first serration being formed in the first shaft hole to engage with a serration of the worm shaft;
    a second spline directly coupled to a side of the first spline, and having a second shaft hole such that the worm shaft is inserted therein, with a second serration being formed in the second shaft hole to engage with a serration of the worm shaft; and
    a molding surrounding outsides of the first and second splines, and coupled to a motor shaft.

2. The damping coupler according to claim 1, wherein a first phase adjustment part is formed on a surface of the first spline, and a second phase adjustment part is formed on a surface of the second spline facing the first spline to be coupled to the first phase adjustment part.

3. The damping coupler according to claim 2, wherein the first phase adjustment part is a recess that is concavely formed in the first spline, and the second phase adjustment part is a protuberance that protrudes out from the second spline.

4. The damping coupler according to claim 2, wherein the first phase adjustment part is a protuberance that protrudes out from the first spline, and the second phase adjustment part is a recess that is concavely formed in the second spline.

5. The damping coupler according to claim 2, wherein a first protrusion is formed on an outside of the first spline, a second protrusion corresponding to the first protrusion is formed on an outside of the second spline, and a third protrusion is formed on an outside of the molding to surround the first protrusion and the second protrusion.

6. The damping coupler according to claim 5, wherein the first serration and the second serration have different phases.

7. The damping coupler according to claim 6, wherein the first phase adjustment part is formed on a line connecting a center of the first shaft hole with a center of the first protrusion, and the second phase adjustment part is formed on a line connecting a center of the second shaft hole with a center of the second protrusion.

8. The damping coupler according to claim 5, wherein the first serration and the second serration have the same phase.

9. The damping coupler according to claim 8, wherein the first phase adjustment part is formed on a line connecting a center of the first shaft hole with a center of the first protrusion, and the second phase adjustment part is formed at a position deviating from a line connecting a center of the second shaft hole with a center of the second protrusion.

10. The damping coupler according to claim 5, wherein an uneven part is formed on an outside of the third protrusion.

11. The damping coupler according to claim 1, wherein the motor shaft has a shaft hole, and the molding is inserted into the shaft hole.

12. The damping coupler according to claim 1, wherein the molding is made of a rubber material.

13. A damping coupler of an electronic steering apparatus, comprising:
    a first spline having a first shaft hole such that a worm shaft is inserted therein, with a first serration being formed in the first shaft hole to engage with a serration of the worm shaft;
    a second spline coupled to a side of the first spline, and having a second shaft hole such that the worm shaft is inserted therein, with a second serration being formed in the second shaft hole to engage with a serration of the worm shaft; and
    a molding surrounding outsides of the first and second splines, and coupled to a motor shaft,
    wherein the motor shaft has a shaft hole, and the molding is inserted into the shaft hole.

14. The damping coupler according to claim 13, wherein a first phase adjustment part is formed on a surface of the first spline, and a second phase adjustment part is formed on a surface of the second spline facing the first spline to be coupled to the first phase adjustment part.

15. The damping coupler according to claim 14, wherein the first phase adjustment part is a recess that is concavely formed in the first spline, and the second phase adjustment part is a protuberance that protrudes out from the second spline.

16. The damping coupler according to claim 14, wherein the first phase adjustment part is a protuberance that protrudes out from the first spline, and the second phase adjustment part is a recess that is concavely formed in the second spline.

17. A damping coupler of an electronic steering apparatus, comprising:
    a first spline having a first shaft hole such that a worm shaft is inserted therein, with a first serration being formed in the first shaft hole to engage with a serration of the worm shaft;
    a second spline coupled to a side of the first spline, and having a second shaft hole such that the worm shaft is inserted therein, with a second serration being formed in the second shaft hole to engage with a serration of the worm shaft; and
    a molding surrounding outsides of the first and second splines, and coupled to a motor shaft,
    wherein the molding is made of a rubber material.

18. The damping coupler according to claim 17, wherein a first phase adjustment part is formed on a surface of the first spline, and a second phase adjustment part is formed on a surface of the second spline facing the first spline to be coupled to the first phase adjustment part.

19. The damping coupler according to claim 18, wherein the first phase adjustment part is a recess that is concavely formed in the first spline, and the second phase adjustment part is a protuberance that protrudes out from the second spline.

20. The damping coupler according to claim 18, wherein the first phase adjustment part is a protuberance that protrudes out from the first spline, and the second phase adjustment part is a recess that is concavely formed in the second spline.

* * * * *